(12) United States Patent
Krishnapura Subbaraya et al.

(10) Patent No.: US 11,544,551 B2
(45) Date of Patent: *Jan. 3, 2023

(54) METHOD AND SYSTEM FOR IMPROVING PERFORMANCE OF AN ARTIFICIAL NEURAL NETWORK

(71) Applicant: WIPRO LIMITED, Bangalore (IN)

(72) Inventors: Prashanth Krishnapura Subbaraya, Bengaluru (IN); Raghavendra Hosabettu, Bangalore (IN)

(73) Assignee: Wipro Limited, Bangalore (IN)

( * ) Notice: Subject to any disclaimer, the term of this patent is extended or adjusted under 35 U.S.C. 154(b) by 888 days.

This patent is subject to a terminal disclaimer.

(21) Appl. No.: 16/195,973

(22) Filed: Nov. 20, 2018

(65) Prior Publication Data

US 2020/0104700 A1 Apr. 2, 2020

(30) Foreign Application Priority Data

Sep. 28, 2018 (IN) .............................. 201841036813

(51) Int. Cl.
*G06N 3/04* (2006.01)
*G06N 3/08* (2006.01)

(52) U.S. Cl.
CPC .................. *G06N 3/08* (2013.01); *G06N 3/04* (2013.01)

(58) Field of Classification Search
CPC ........... G06N 3/08; G06N 3/04; G06N 3/082; G06N 3/02
See application file for complete search history.

(56) References Cited

U.S. PATENT DOCUMENTS 11,093,832 B2 * 8/2021 Chen ...................... G06N 3/082
11,227,213 B2 * 1/2022 Wang ........................ G06N 3/08
(Continued)

FOREIGN PATENT DOCUMENTS

CN 108631787 B * 4/2020 .......... H03M 7/3082
WO WO-2018090706 A1 * 5/2018 ............... G06N 3/04

OTHER PUBLICATIONS

Afghah, F., et al., "A Game Theoretic Predictive Modeling Approach to False Alarm Reduction in Intensive Cars Units (ICUs)", Springer Link (2015), pp. 1-12.
(Continued)

*Primary Examiner* — David R Vincent
(74) *Attorney, Agent, or Firm* — Finnegan, Henderson, Farabow, Garrett & Dunner, LLP

(57) ABSTRACT

This disclosure relates to method and system for improving performance of an artificial neural network (ANN). The method may include generating a weight matrix comprising weights of neural nodes in a given layer for each layer of the ANN, determining a marginal contribution value of a given neural node for each neural node in the given layer with respect to other neural nodes in the given layer, executing an elimination decision for each neural node in each layer based on the corresponding marginal contribution value, determining a distributed surplus value of a given remaining neural node in a given layer based on the marginal contribution values of a coalition of remaining neural nodes in the given layer for each remaining neural node in each layer, and updating the weight matrix based on the distributed surplus value of each remaining neural node in each layer.

17 Claims, 4 Drawing Sheets

(56) References Cited

U.S. PATENT DOCUMENTS

| | | | | |
|---|---|---|---|---|
| 2018/0300629 | A1* | 10/2018 | Kharaghani | G06N 3/0472 |
| 2019/0087729 | A1* | 3/2019 | Byun | G06N 3/082 |
| 2019/0095819 | A1* | 3/2019 | Varadarajan | G06N 20/00 |
| 2019/0147339 | A1* | 5/2019 | Nachum | G06N 3/0472 |
| | | | | 706/25 |
| 2019/0197406 | A1* | 6/2019 | Darvish Rouhani | G06N 20/00 |
| 2020/0202197 | A1* | 6/2020 | Subhaschandra Banakar | |
| | | | | G06K 9/6262 |
| 2020/0234130 | A1* | 7/2020 | Yan | G06N 3/0454 |
| 2020/0234137 | A1* | 7/2020 | Chen | G06N 3/0454 |
| 2021/0027166 | A1* | 1/2021 | Gorokhov | G06N 3/0481 |

OTHER PUBLICATIONS

Cohen, S., et al., "Feature Selection via Coalitional Game Theory", Neural Computation (2007), vol. 19, pp. 1939-1961.

Zaeri-Amirani, M., "A Feature Selection Method Based on Shapely Value to False Alarm Reduction in ICUs, A Genetic-Algorithm Approach", ResearchGate (2018), pp. 1-6.

\* cited by examiner

METHOD AND SYSTEM FOR IMPROVING PERFORMANCE OF AN ARTIFICIAL NEURAL NETWORK

TECHNICAL FIELD

This disclosure relates generally to artificial neural network (ANN), and more particularly to method and system for improving performance of an ANN.

BACKGROUND

Artificial neural network (ANN) may be employed in a wide variety of applications, including, but not limited to, computer vision, image recognition, natural language processing, speech recognition, and decision making. An ANN may learn to perform a task by considering examples, generally without being programmed with any task-specific rules. For example, in image recognition, the ANN may learn to identify specific objects in images by analyzing example images that may or may not have such specific objects. The ANN is based on a collection of connected nodes called 'neural nodes' aggregated into one or more layers. The connections between 'neural nodes' are called 'edges'. Each of the 'neural nodes' and 'edges' may have a 'weight' that may adjust as learning proceeds.

The inability to clearly understand and explain the reason for a decision taken by the ANN is one of the main differences between artificial and human intelligence. As stated above, the ANN may usually provide an answer based on the data they have learned but not a reason for how it arrived to that answer. Thus, in many ANN based applications, it is difficult to find how the ANN made a specific decision. This limitations pose challenges in improving the decision making of the ANN or altering the decision making of the ANN so as to minimize false positives. It may, therefore, be desirable to understand and explain how an ANN came to a particular decision, so as to further improve the decision making of the ANN.

SUMMARY

In one embodiment, a method for improving performance of an artificial neural network (ANN) is disclosed. In one example, the method may include generating, for each layer of the ANN, a weight matrix comprising a weight of each neural node in a given layer. The method may further include determining, for each neural node in the given layer, a marginal contribution value of a given neural node in the given layer with respect to other neural nodes in the given layer based on an input vector to the given layer and a modified weight matrix. The modified weight matrix is derived from the weight matrix by replacing weight of the given neural node in the given layer with a predefined weight. The method may further include executing an elimination decision for each neural node in each layer based on the corresponding marginal contribution value. The method may further include determining, for each remaining neural node in each layer, a distributed surplus value of a given remaining neural node in a given layer based on the marginal contribution values of a coalition of remaining neural nodes in the given layer and a number of remaining neural nodes in the given layer. The method may further include updating the weight matrix based on the distributed surplus value of each remaining neural node in each layer.

In one embodiment, a system for improving performance of an ANN is disclosed. In one example, the system may include an ANN improvement device, which may include at least one processor and a memory communicatively coupled to the at least one processor. The memory may store processor-executable instructions, which, on execution, may cause the processor to generate, for each layer of the ANN, a weight matrix comprising a weight of each neural node in a given layer. The processor-executable instructions, on execution, may further cause the processor to determine, for each neural node in the given layer, a marginal contribution value of a given neural node in the given layer with respect to other neural nodes in the given layer based on an input vector to the given layer and a modified weight matrix. The modified weight matrix is derived from the weight matrix by replacing weight of the given neural node in the given layer with a predefined weight. The processor-executable instructions, on execution, may further cause the processor to execute an elimination decision for each neural node in each layer based on the corresponding marginal contribution value. The processor-executable instructions, on execution, may further cause the processor to determine, for each remaining neural node in each layer, a distributed surplus value of a given remaining neural node in a given layer based on the marginal contribution values of a coalition of remaining neural nodes in the given layer and a number of remaining neural nodes in the given layer. The processor-executable instructions, on execution, may further cause the processor to update the weight matrix based on the distributed surplus value of each remaining neural node in each layer.

In one embodiment, a non-transitory computer-readable medium storing computer-executable instructions for improving performance of an ANN is disclosed. In one example, the stored instructions, when executed by a processor, may cause the processor to perform operations including generating, for each layer of the ANN, a weight matrix comprising a weight of each neural node in a given layer. The operations may further include determining, for each neural node in the given layer, a marginal contribution value of a given neural node in the given layer with respect to other neural nodes in the given layer based on an input vector to the given layer and a modified weight matrix. The modified weight matrix is derived from the weight matrix by replacing weight of the given neural node in the given layer with a predefined weight. The operations may further include executing an elimination decision for each neural node in each layer based on the corresponding marginal contribution value. The operations may further include determining, for each remaining neural node in each layer, a distributed surplus value of a given remaining neural node in a given layer based on the marginal contribution values of a coalition of remaining neural nodes in the given layer and a number of remaining neural nodes in the given layer. The operations may further include updating the weight matrix based on the distributed surplus value of each remaining neural node in each layer.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
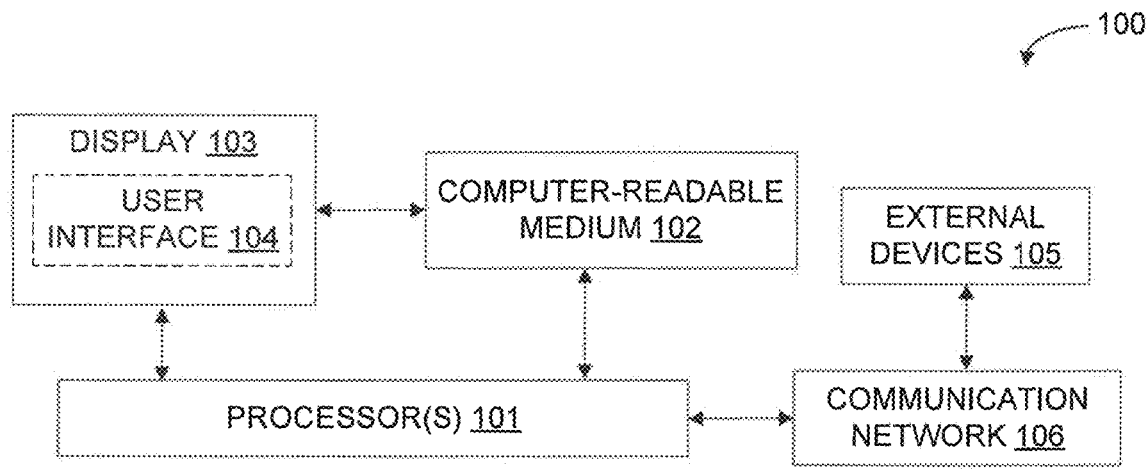
FIG. 1 is a block diagram of an exemplary system for improving performance of an artificial neural network (ANN), in accordance with some embodiments of the present disclosure.

Referring now to FIG. 1, an exemplary system 100 for improving performance of an artificial neural network (ANN) is illustrated, in accordance with some embodiments of the present disclosure. As will be appreciated, the system 100 may implement an ANN for a specific application. Further, the system may implement an ANN improvement engine, in accordance with some embodiments of the present disclosure. The ANN improvement engine may improve performance of the ANN by minimizing false positive in the ANN. In particular, the system 100 may include an ANN improvement device (for example, server, desktop, laptop, notebook, netbook, tablet, smartphone, mobile phone, or any other computing device) that may implement the ANN improvement engine. It should be noted that, in some embodiments, the ANN improvement engine may help in understanding the reason for the decisions taken by the ANN and, therefore, improve its performance by reducing the number of false positives in the outcome.

As will be described in greater detail in conjunction with FIGS. 2-4, the ANN improvement engine may generate, for each layer of the ANN, a weight matrix comprising a weight of each neural node in a given layer. The ANN improvement engine may then determine, for each neural node in the given layer, a marginal contribution value of a given neural node in the given layer with respect to other neural nodes in the given layer based on an input vector to the given layer and a modified weight matrix. It should be noted that the modified weight matrix is derived from the weight matrix by replacing weight of the given neural node in the given layer with a predefined weight. The ANN improvement engine may then execute an elimination decision for each neural node in each layer based on the corresponding marginal contribution value. The ANN improvement engine may then determine, for each remaining neural node in each layer, a distributed surplus value of a given remaining neural node in a given layer based on the marginal contribution values of a coalition of remaining neural nodes in the given layer and a number of remaining neural nodes in the given layer. The ANN improvement engine may then update the weight matrix based on the distributed surplus value of each remaining neural node in each layer. The ANN improvement engine may further employ the updated weight matrix to determine the outcome of the ANN, thereby reducing the number of false positives in the outcome.

The system 100 may include one or more processors 101, a computer-readable medium (for example, a memory) 102, and a display 103. The computer-readable storage medium 102 may store instructions that, when executed by the one or more processors 101, cause the one or more processors 101 to improve performance of the ANN, in accordance with aspects of the present disclosure. The computer-readable storage medium 102 may also store various data (for example, weight matrix for a ANN, predefined weight for generating modified weight matrix, modified weight matrix, input vector, expected output vector, actual output vector, marginal contribution value of each neural node in each layer of the ANN, distributed surplus value of each remaining neural node in each layer, updated weight matrix, and the like) that may be captured, processed, and/or required by the system 100. The system 100 may interact with a user via a user interface 104 accessible via the display 103. The system 100 may also interact with one or more external devices 105 over a communication network 106 for sending or receiving various data. The external devices 105 may include, but may not be limited to, a remote server, a digital device, or another computing system.

Figure 2:
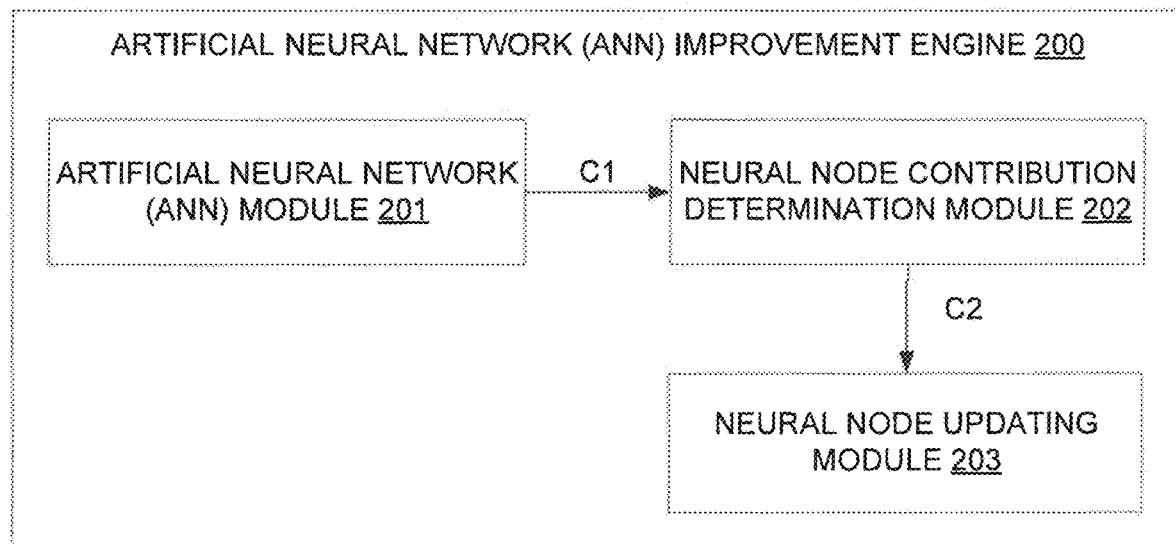
FIG. 2 is a functional block diagram of an ANN improvement engine, in accordance with some embodiments of the present disclosure.

Referring now to FIG. 2, a functional block diagram of an ANN improvement engine 200, implemented by the system 100 of FIG. 1, is illustrated, in accordance with some embodiments of the present disclosure. The ANN improvement engine 200 may include various modules that perform various functions so as to analyze and understand the decisions made by the ANN (i.e., the outcome of the ANN) and to modify the weights of the neural nodes for improving the performance of the ANN. In some embodiments, the ANN improvement engine 200 may include an ANN module 201, a neural node contribution determination module 202, and a neural node updating module 203. As will be appreciated by those skilled in the art, all such aforementioned modules 201-203 may be represented as a single module or a combination of different modules. Moreover, as will be appreciated by those skilled in the art, each of the modules 201-203 may reside, in whole or in parts, on one device or multiple devices in communication with each other.

The ANN module 201 may build and train an ANN with a training dataset for a specific application. The specific application may include, but may not be limited to, computer vision, image recognition, natural language processing, speech recognition, and decision making. The ANN module 201 may then generate an output weight matrix of all neural nodes in each layer of the ANN.

The neural node contribution determination module 202 may receive the output weight matrix of all neural nodes in each layer of the ANN from the ANN module 201 via a C1 interface using standard wired or wireless data transfer protocols. The neural node contribution determination module 202 may then calculate a contribution of each neural node in a given layer to the output loss of the ANN. In some embodiments, the neural node contribution determination module 202 may employ co-operative game theory algorithm in order to calculate the contribution of each neural node to the output loss of the ANN. The neural node contribution determination module 202 may then execute an elimination decision for one or more neural nodes in the given layer based on their corresponding contributions. The neural node contribution determination module 202 may further determine surplus values generated by the remaining neural nodes in the given layer. It should be noted that the weights of remaining neural nodes may be modified based on the distribution of generated surplus values.

In particular, the neural node contribution determination module 202 may determine a marginal contribution value of each neural node in a given layer with respect to other neural nodes in that layer. The neural node contribution determination module 202 may then eliminate one or more neural nodes in the given layer based on their corresponding marginal contributions. The neural node contribution determination module 202 may further determine a distributed surplus value of each remaining neural node in the given layer. As stated above, the distributed surplus values may be used to update the weights of the remaining neural nodes in the given layer.

The neural node updating module 203 may receive distribution of generated surplus values from the neural node contribution determination module 202 via a C2 interface using standard wired or wireless data transfer protocols. The neural node updating module 203 may then update weights of each remaining neural node in the given layer based on the distribution of generated surplus values. As will be appreciated, the updated weight matrix may result in reduction in the output loss of the ANN, which in turn may result in improvement of the accuracy of the ANN.

By way of example, the ANN improvement engine 200 may explain how a neural node makes a decision based on its overall contribution with respect to other neural nodes on the outcome. In the co-operative game theory, a final impact of all values on the output may depend on whether each value is having marginal contribution, no contribution, or equal contribution. As discussed above, each neural node contribution may be calculated using the distribution of generated surplus by the coalition of all the neural nodes. Based on the value so obtained, how a neural node made a decision may be explained and the performance may be improved.

It should be noted that the ANN improvement engine 200 may be implemented in programmable hardware devices such as programmable gate arrays, programmable array logic, programmable logic devices, and so forth. Alternatively, the ANN improvement engine 200 may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine, Indeed, an engine of executable code could be a single instruction, or many instructions, and may even be distributed over several different code segments, among different applications, and across several memory devices.

As will be appreciated by one skilled in the art, a variety of processes may be employed for improving performance of an ANN. For example, the exemplary system 100 and the associated ANN improvement engine 200 may improve the performance of the ANN by the processes discussed herein. In particular, as will be appreciated by those of ordinary skill in the art, control logic and/or automated routines for performing the techniques and steps described herein may be implemented by the system 100 and the ANN improvement engine 200, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
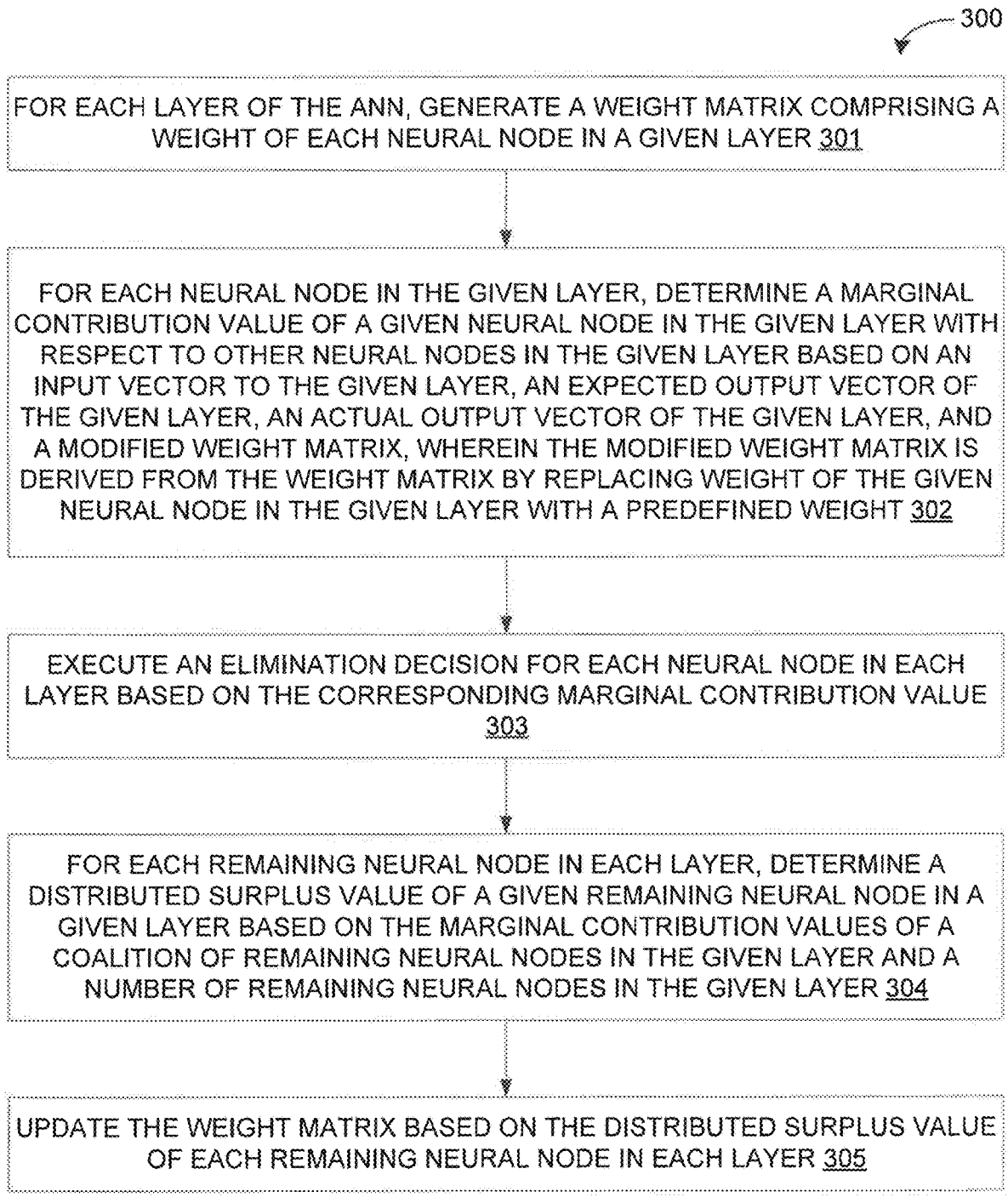
FIG. 3 is a flow diagram of an exemplary process for improving performance of an ANN, in accordance with some embodiments of the present disclosure.

For example, referring now to FIG. 3, exemplary control logic 300 for improving performance of an ANN via a system, such as the system 100, is depicted via a flowchart, in accordance with some embodiments of the present disclosure. As illustrated in the flowchart, the control logic 300 may include the steps of generating, for each layer of the ANN, a weight matrix comprising a weight of each neural node in a given layer at step 301; determining, for each neural node in the given layer, a marginal contribution value of a given neural node in the given layer with respect to other neural nodes in the given layer based on an input vector to the given layer and a modified weight matrix at step 302; executing an elimination decision for each neural node in each layer based on the corresponding marginal contribution value at step 303; determining, for each remaining neural node in each layer, a distributed surplus value of a given remaining neural node in a given layer based on the marginal contribution values of a coalition of remaining neural nodes in the given layer and a number of remaining neural nodes in the given layer at step 304; and updating the weight matrix based on the distributed surplus value of each remaining neural node in each layer at step 305. It should be noted that the modified weight matrix may be derived from the weight matrix by replacing weight of the given neural node in the given layer with a predefined weight. In some embodiments, the predefined weight in the modified weight matrix may be about zero.

In some embodiments, generating the weight matrix at step 301 may include the steps of building and training the ANN for a specific application. Additionally, in some embodiments, determining the marginal contribution value of the given neural node in the given layer with respect to other neural nodes in the given layer at step 302 may include the steps of determining an output loss of the ANN based on the weight matrix for the given layer as a difference between the expected output vector of the ANN and an actual output vector of the ANN based on the weight matrix for the given layer, determining an output loss of the ANN based on the modified weight matrix for the given layer with respect to the given neural node as a difference between the expected output vector of the ANN and an actual output vector of the ANN based on the modified weight matrix for the given layer with respect to the given neural node, and determining a difference between the output loss of the ANN for the input vector based on the weight matrix for the given layer and the output loss of the ANN for the input vector based on the modified weight matrix for the given layer with respect to the given neural node.

Further, in some embodiments, executing the elimination decision at step 303 may include the step of removing a given neural node for which the corresponding marginal contribution value is less than an adaptive threshold value. It should be noted that, in some embodiments, the adaptive threshold value may be determined based on the marginal contribution value of each neural node in the given layer. Additionally, it should be noted that removing the given neural node may include defining the weight of the given neural node as zero.

Further, in some embodiments, determining the distributed surplus value of the given remaining neural node in the given layer at step 304 may include the step of determining an average marginal contribution value of the coalition of remaining neural nodes in the given layer. Moreover, in some embodiments, updating the weight matrix at step 305 may include the step of replacing the original weight of each remaining neural node in each layer with a corresponding distributed surplus value.

Figure 4:
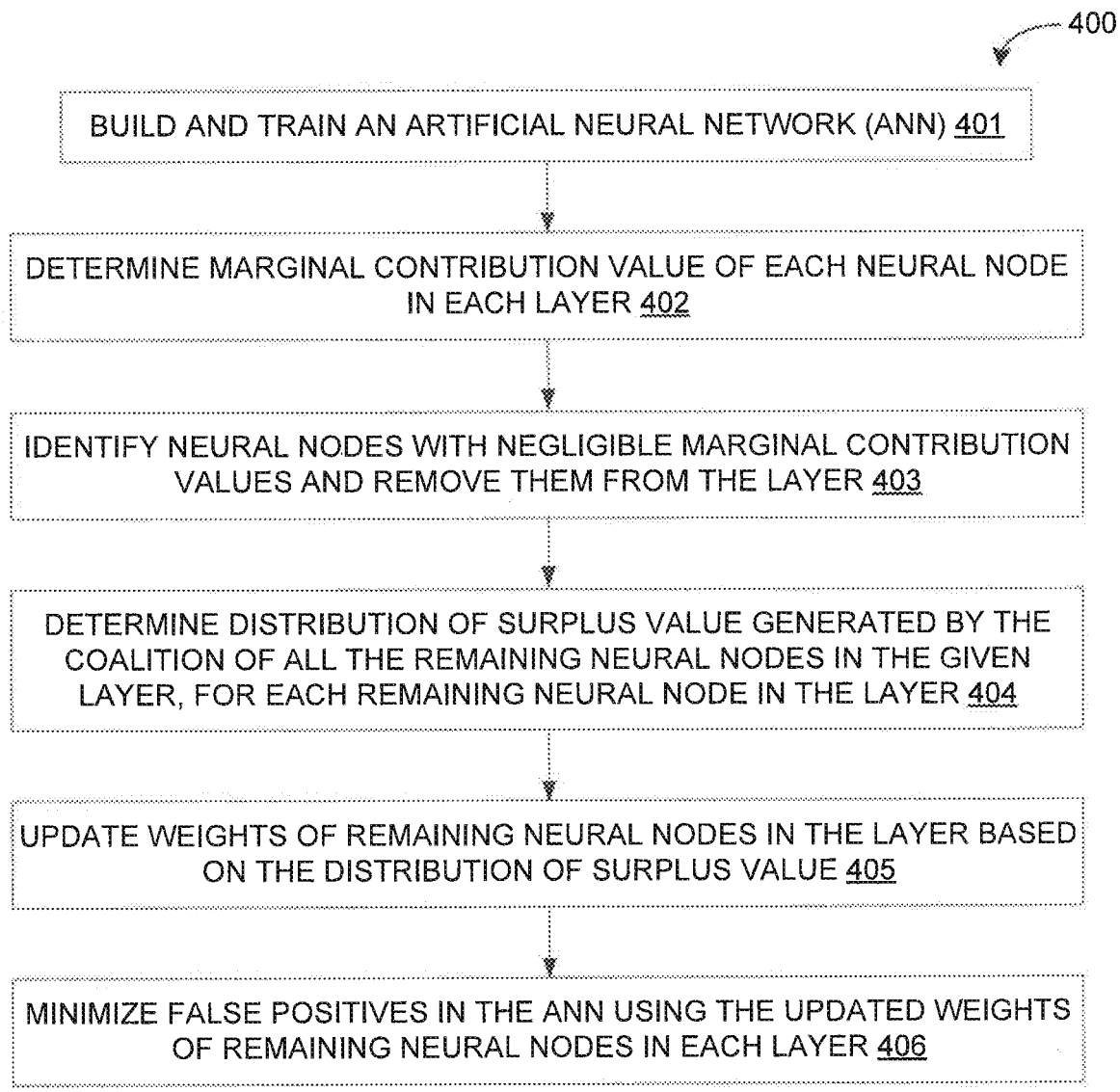
FIG. 4 is a flow diagram of a detailed exemplary process for improving performance of an ANN, in accordance with some embodiments of the present disclosure.

Referring now to FIG. 4, exemplary control logic 400 for improving performance of an ANN is depicted in greater detail via a flowchart, in accordance with some embodiments of the present disclosure. As illustrated in the flowchart, at step 401, the control logic 400 may build and train the ANN for a specific application using the ANN module 201. Thus, a weight matrix may be generated for each layer of the ANN. The weight matrix may include a weight of each neural node in the given layer.

At step 402, the control logic 400 may determine marginal contribution value of each neural node in the weight matrix for each layer of the ANN using the neural node contribution determination module 202. The weight of a given neural node in the weight matrix for a given layer may be changed to a predefined weight (e.g., about zero) so as to generate a modified weight matrix for the given layer with respect to the given neural node. The control logic 400 may then determine the output loss of the ANN for the given neural node by determining the difference between the output loss of the ANN with the modified weight matrix of the given layer of the neural network with respect to the given neural node and the output loss of the ANN with the original weight matrix of the given layer of the neural network. In other words, the difference in the output loss before of the ANN making weight of the given neural node to the predefined value (e.g., about zero) and after changing it to the predefined value (e.g., about zero) may be taken as the marginal contribution value of the given neural node.

At step 403, the control logic 400 may identify neural nodes with no or negligible marginal contribution values and remove them from the given layer using the neural node contribution determination module 202. As will be appreciated, in an exemplary embodiment, if weight of a neural node is made about zero and the output loss of the ANN remains unaffected (i.e., about same), then that neural node may not have any contribution to the ANN. Such neural nodes may be removed as they may not impact the results. Further, as will be appreciated, by removing the no or negligible contribution neural nodes, the performance of the ANN may increase as the computation time may reduce.

At step 404, the control logic 400 may determine distribution of surplus value generated by the coalition of all the remaining neural nodes in the given layer, for each remaining neural node in the given layer, using the neural node contribution determination module 202. After removing the neural nodes having negligible contribution from the given layer, the control logic 400 may determine the distribution of the surplus value generated by the coalition of all the remaining neural nodes, for each remaining neural node in the given layer, as per equation (1) below:

$$\phi_i(v) = \frac{1}{|N|!} \sum_R [v(P_i^R \cup \{i\}) - v(P_i^R)] \quad \text{Equation (1)}$$

The average of marginal contributions of a neural node with respect to all other neural nodes in the weight matrix, determined in step 402, may be considered as the final payoff value for that neural node. At step 405, the control logic 400 may update weights of remaining neural nodes in the layer, based on the distribution of surplus value determined at step 404, using the neural node updating module 203. In the neural node updating module 203, the distribution of surplus value determined at step 404 is taken as the input. The weight of neural nodes with no or negligible contributions are made to 0, as they don't have any impact. The distribution of surplus value gives the maximum payoff value that a neural node may get.

It should be noted that, for a multi-layer neural network, steps 402-405 may be repeated for all the neural node in all the layers separately. When weights of all the remaining neural nodes in all the layers of the ANN are updated with their respective distribution of surplus value, the ANN will have updated weights for only those neural nodes with some impact to the output. This methodology of activating only those neural nodes which have some impact on the output may reduce the output loss of the ANN and thereby the false positives in the output.

Further, at step 406, the control logic 400 may minimize false positives in the ANN using the updated weights of remaining neural nodes. As stated above, with the updated weights the ANN may be able to activate all required neural nodes for a given input. These activated neural nodes may then determine the output of the network. Hence, by activating proper neural nodes, the ANN may reduce the false positives in the output data.

By way of an example, an ANN may be a basic single layer binary classifier with two classes A and B such that class A is represented by output '0' while class B is represented by output '1'. The output vector is of length '4' corresponding to four neural nodes n1, n2, n3, and n4 having respective weights. The average of the output vector is used to determine the final output value. Thus, if the given input data is of class A and the output value is 0.6, then the classifier will predict it as 1 (i.e., belonging to class B). This is a false positive output. The ANN improvement device may then improve the ANN as follows:

For example,

Input vector=[1.1, 0.3, 2.4, 0.3]

Original weights of Neural Nodes (i.e., weight matrix)= [1.1, 0.2, 0.3, 1.4]

$$\text{Actual output} = Avg(\text{Input vector} * \text{Weights of Neural Nodes})$$
$$= Avg([1.1*1.1, 0.3*0.2, 2.4*0.3, 0.3*1.4])$$
$$= Avg([1.21, 0.06, 0.72, 0.42])$$
$$== 0.6 \sim 1$$

Expected output=0

Output Loss=Expected output−Actual output=|0−0.6|=0.6

To reduce the false positive output, the distribution of generated surplus by the coalition of all the neural nodes may be employed. As discussed above, the determination of the surplus value involves two steps: a) calculating the marginal contribution of all the neural nodes, and b) finding the neural nodes without any impact. Thus, when n3='the predefined value (say. '0')' with respect to the remaining neural nodes in coalition and the output loss changes from x to y, then the marginal contribution value of n3 with respect to {n1, n2, n4} may be determined as |x-y|. In this way, neural node contribution determination module 202 may determine the marginal contribution value for all neural nodes with respect to all possible combinations.

For example, the marginal contribution value of n3 {n1, n2, n4} is determined as below:

Input vector=[1.1, 0.3, 2.4, 0.3]
Modified weights of Neural Nodes (i.e., modified weight matrix)=[1.1, 0.2, 0, 1.4]

$$\text{Actual output} = Avg(\text{Input vector} * \text{Modified Weights of Neural Nodes})$$
$$= Avg([1.1*1.1, 0.3*0.2, 2.4*0, 0.3*1.4])$$
$$= Avg([1.21, 0.06, 0, 0.42])$$
$$== 0.42$$

Expected output=0
Output Loss=Expected output−Actual output=|0−0.42|=0.42

$$\text{Marginal contribution value of } n3\{n1, n2, n4\} = \text{Difference between}$$
$$= \text{output loss}$$
$$= |0.6 - 0.42|$$
$$== 0.18$$

As discussed above, if there is no or negligible difference in the output loss of the ANN, then that neural node may be considered to have no or negligible impact on the ANN and may, therefore, be removed by making its weight to zero. After determining the marginal contribution of each neural node with respect to all remaining neural nodes, the average marginal contribution value may be determined. For example, $$n1\{n2, n3, n4\} = 0.2$$
$$n1\{n2, n3\} = 0.15$$
$$n1\{n3, n4\} = 0.4$$
$$\vdots$$
$$n1\{n4\} = 0.3$$

Average marginal contribution value of n1=(0.2+0.15+0.4+ . . . 0.3)/N, where N=number of neural nodes in that layer.

The weights of neural nodes may be then updated with the surplus value determined. The updated weights of neural nodes may then be employed to improve the performance of the ANN by minimizing false positives in the outcome. For example, Input vector=[1.1, 0.3, 2.4, 0.3]
Updated weights of Neural Nodes (i.e., updated weight matrix)=[0.8, 0, 0.1, 0.9]

$$\text{Actual output} = Avg(\text{Input vector} * \text{Weights of Neural Nodes})$$
$$= Avg([1.1*0.8, 0.3*0, 2.4*0.1, 0.3*0.9])$$
$$= Avg([1.21, 0, 0.24, 0.27])$$
$$== 0.43 \sim 0$$

Expected output=0
Output Loss=Expected output Actual output=|0−0.43|=0.43

Thus, by using the updated weight matrix, the loss is reduced from 0.6 to 0.43 while the false positives are also reduced.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
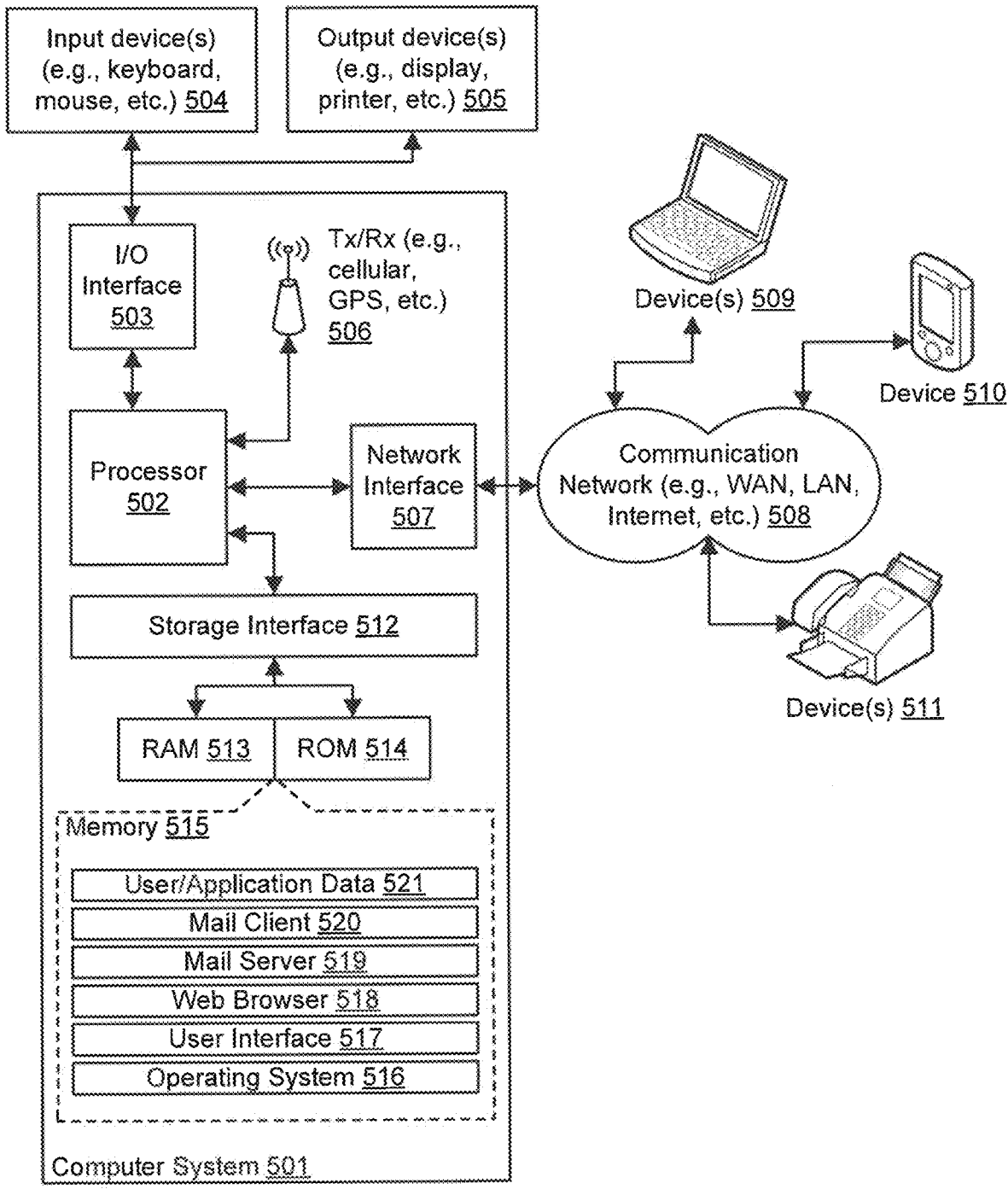
FIG. 5 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 5, a block diagram of an exemplary computer system 501 for implementing embodiments consistent with the present disclosure is illustrated. Variations of computer system 501 may be used for implementing system 100 for improving performance of an ANN. Computer system 501 may include a central processing unit ("CPU" or "processor") 502. Processor 502 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., TEXAS INSTRUMENTS® WILINK WL1286®, BROADCOM® BCM45501UB8®, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista/7/8, etc.), APPLE® IOS®, GOOGLE® ANDROID®, BLACKBERRY® OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 501 may implement a web browser 518 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 501 may implement a mail server 519 stored program component. The mail server may be an Internet mail server such as MICROSOFT® EXCHANGE®, or the like. The mail server may utilize facilities such as ASP, ActiveX, ANSI C++/C#, MICROSOFT .NET® CGI scripts, JAVA®, JAVASCRIPT®, PERL®, PHP®, PYTHON®, VVebObjects, etc. The mail server may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 501 may implement a mail client 520 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 501 may store user/application data 521, such as the data, variables, records, etc. (e.g., weight matrix for a ANN, predefined weight for generating modified weight matrix, modified weight matrix, input vector, expected output vector, actual output vector, marginal contribution value of each neural node in each layer of the ANN, distributed surplus value of each remaining neural node in each layer, updated weight matrix, and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above are not routine, or conventional, or well understood in the art. The techniques discussed above provide for improving performance of an ANN by reducing the number of false positives in the outcome. The techniques employ co-operative game theory in order to achieve the same. The co-operative game theory helps in understanding the reason for the decisions taken by an ANN and, therefore, help in improving the efficiency of the ANN. Further, the false positives may be minimized based on the distribution of generated surplus values of neural nodes. Further, techniques described in the various embodiments discussed above provide for improvement in the execution time of the ANN as the neural nodes which have no or negligible contribution to the output are removed. Moreover, the techniques may be easily deployed in any cloud based servers for access and use as an 'application as a service' by any computing device including mobile device. For example, the ANN improvement engine may be implemented on a cloud based server and used for improving performance of various ANN based mobile device applications.

The specification has described method and system for improving performance of an ANN. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of improving performance of an artificial neural network (ANN), the method comprising:
    for each layer of the ANN, generating, by an ANN improvement device, a weight matrix comprising a weight of each neural node in a given layer;
    for each layer of the ANN, determining, by the ANN improvement device, a first output loss of the ANN based on a difference between an expected output vector of the ANN and a first actual output vector of the ANN determined using the weight matrix for the given layer;
    for each layer of the ANN, calculating, by the ANN improvement device, a modified weight matrix from the weight matrix by replacing weight of the given neural node in the given layer with a predefined weight;
    for each layer of the ANN, determining, by the ANN improvement device, a second output loss of the ANN based on a difference between the expected output vector and a second actual output vector of the ANN determined using the modified weight matrix of the given layer with respect to a given neural node;
    for each neural node in the given layer, determining, by the ANN improvement device, a marginal contribution value of the given neural node in the given layer with respect to other neural nodes in the given layer based on an input vector to the given layer and the modified weight matrix, wherein the marginal contribution value of the given neural node in the given layer with respect to other neural nodes in the given layer is determined by a difference between the first output loss of the ANN and the second output loss of the ANN;
    identifying, by the ANN improvement device, one or more neural nodes with no or negligible marginal contribution value based on the corresponding marginal contribution value in order to reduce computation;
    executing, by the ANN improvement device, an elimination decision for each neural node in each layer by removing the identified one or more neural nodes;
    for each remaining neural node in each layer, determining, by the ANN improvement device, a distributed surplus value of a given remaining neural node in a given layer based on the marginal contribution values of a coalition of remaining neural nodes in the given layer and a number of remaining neural nodes in the given layer;
    updating, by the ANN improvement device, the weight matrix based on the distributed surplus value of each remaining neural node in each layer; and
    minimizing, by the ANN improvement device, false positives in the ANN using the updated weights of remaining neural nodes in the given layer.

2. The method of claim 1, wherein generating the weight matrix comprises building and training the ANN for a specific application.

3. The method of claim 1, wherein the predefined weight in the modified weight matrix is about zero.

4. The method of claim 1, wherein executing the elimination decision comprises removing a given neural node for which the corresponding marginal contribution value is less than an adaptive threshold value.

5. The method of claim 4, wherein the adaptive threshold value is determined by the ANN improvement device based on the marginal contribution value of each neural node in the given layer, and wherein removing the given neural node comprises defining the weight of the given neural node as zero.

6. The method of claim 1, wherein the distributed surplus value of the given remaining neural node comprises an average marginal contribution value of the coalition of remaining neural nodes in the given layer.

7. The method of claim 1, wherein updating the weight matrix comprises replacing the original weight of each remaining neural node in each layer with a corresponding distributed surplus value.

8. A system for improving performance of an artificial neural network (ANN), the system comprising:
   an ANN improvement device comprising at least one processor and a computer-readable medium storing instructions that, when executed by the at least one processor, cause the at least one processor to perform operations comprising:
   for each layer of the ANN, generating a weight matrix comprising a weight of each neural node in a given layer;
   for each layer of the ANN, determining a first output loss of the ANN based on a difference between an expected output vector of the ANN and a first actual output vector of the ANN determined using the weight matrix for the given layer;
   for each layer of the ANN, calculating a modified weight matrix from the weight matrix by replacing weight of the given neural node in the given layer with a pre-defined weight;
   for each layer of the ANN, determining a second output loss of the ANN based on a difference between the expected output vector and a second actual output vector of the ANN determined using the modified weight matrix of the given layer with respect to a given neural node;
   for each neural node in the given layer, determining a marginal contribution value of the given neural node in the given layer with respect to other neural nodes in the given layer based on an input vector to the given layer and the modified weight matrix, wherein the marginal contribution value of the given neural node in the given layer with respect to other neural nodes in the given layer is determined by a difference between the first output loss of the ANN and the second output loss of the ANN;
   identifying one or more neural nodes with no or negligible marginal contribution value based on the corresponding marginal contribution value in order to reduce computation;
   executing an elimination decision for each neural node in each layer by removing the identified one or more neural nodes;
   for each remaining neural node in each layer, determining a distributed surplus value of a given remaining neural node in a given layer based on the marginal contribution values of a coalition of remaining neural nodes in the given layer and a number of remaining neural nodes in the given layer;
   updating the weight matrix based on the distributed surplus value of each remaining neural node in each layer; and
   minimizing false positives in the ANN using the updated weights of remaining neural nodes in the given layer.

9. The system of claim 8, wherein executing the elimination decision comprises removing a given neural node for which the corresponding marginal contribution value is less than an adaptive threshold value.

10. The system of claim 9, wherein the adaptive threshold value is determined by the ANN improvement device based on the marginal contribution value of each neural node in the given layer, and wherein removing the given neural node comprises defining the weight of the given neural node as zero.

11. The system of claim 8, wherein the distributed surplus value of the given remaining neural node comprises an average marginal contribution value of the coalition of remaining neural nodes in the given layer.

12. The system of claim 8, wherein updating the weight matrix comprises replacing the original weight of each remaining neural node in each layer with a corresponding distributed surplus value.

13. A non-transitory computer-readable medium storing computer-executable instructions for improving performance of an artificial neural network (ANN), the computer-executable instructions configured for:
   for each layer of the ANN, generating a weight matrix comprising a weight of each neural node in a given layer;
   for each layer of the ANN, determining a first output loss of the ANN based on a difference between an expected output vector of the ANN and a first actual output vector of the ANN determined using the weight matrix for the given layer;
   for each layer of the ANN, calculating a modified weight matrix from the weight matrix by replacing weight of the given neural node in the given layer with a pre-defined weight;
   for each layer of the ANN, determining a second output loss of the ANN based on a difference between the expected output vector and a second actual output vector of the ANN determined using the modified weight matrix of the given layer with respect to a given neural node;
   for each neural node in the given layer, determining a marginal contribution value of the given neural node in the given layer with respect to other neural nodes in the given layer based on an input vector to the given layer and the modified weight matrix, wherein the marginal contribution value of the given neural node in the given layer with respect to other neural nodes in the given layer is determined by a difference between the first output loss of the ANN and the second output loss of the ANN;
   identifying one or more neural nodes with no or negligible marginal contribution value based on the corresponding marginal contribution value in order to reduce computation;
   executing an elimination decision for each neural node in each layer by removing the identified one or more neural nodes;
   for each remaining neural node in each layer, determining a distributed surplus value of a given remaining neural node in a given layer based on the marginal contribution values of a coalition of remaining neural nodes in the given layer and a number of remaining neural nodes in the given layer;
   updating the weight matrix based on the distributed surplus value of each remaining neural node in each layer; and minimizing false positives in the ANN using the updated weights of remaining neural nodes in the given layer.

14. The non-transitory computer-readable medium of claim 13, wherein executing the elimination decision comprises removing a given neural node for which the corresponding marginal contribution value is less than an adaptive threshold value.

15. The non-transitory computer-readable medium of claim 14, wherein the adaptive threshold value is determined by the ANN improvement device based on the marginal contribution value of each neural node in the given layer, and wherein removing the given neural node comprises defining the weight of the given neural node as zero.

16. The non-transitory computer-readable medium of claim 13, wherein the distributed surplus value of the given remaining neural node comprises an average marginal contribution value of the coalition of remaining neural nodes in the given layer.

17. The non-transitory computer-readable medium of claim 13, wherein updating the weight matrix comprises replacing the original weight of each remaining neural node in each layer with a corresponding distributed surplus value.

* * * * *